United States Patent
Ross et al.

(10) Patent No.: US 11,254,112 B2
(45) Date of Patent: Feb. 22, 2022

(54) COVER WITH WEAR DETECTION PROPERTIES

(71) Applicant: Stryker Corporation, Kalamazoo, MI (US)

(72) Inventors: Ryan Ross, New Carlisle, IN (US); Patrick Lafleche, Kalamazoo, MI (US); Matthew A. Ward, Farmington Hills, MI (US)

(73) Assignee: Stryker Corporation, Kalamazoo, MI (US)

(*) Notice: Subject to any disclaimer, the term of this patent is extended or adjusted under 35 U.S.C. 154(b) by 0 days.

(21) Appl. No.: 16/935,347

(22) Filed: Jul. 22, 2020

(65) Prior Publication Data

US 2021/0030173 A1 Feb. 4, 2021

Related U.S. Application Data

(60) Provisional application No. 62/881,109, filed on Jul. 31, 2019.

(51) Int. Cl.
*B32B 27/30* (2006.01)
*B32B 27/32* (2006.01)
(Continued)

(52) U.S. Cl.
CPC ........... *B32B 27/32* (2013.01); *B32B 27/08* (2013.01); *B32B 27/304* (2013.01);
(Continued)

(58) Field of Classification Search
CPC ....... B32B 27/32; B32B 27/08; B32B 27/304; B32B 27/322; B32B 27/365; B32B 27/40;
(Continued)

(56) References Cited

U.S. PATENT DOCUMENTS

| 4,538,311 A | 9/1985 | Hall et al. |
| 4,704,108 A | 11/1987 | Okada et al. |

(Continued)

FOREIGN PATENT DOCUMENTS

| CA | 2094279 C | 4/1999 |
| CN | 101103268 A | 1/2008 |

(Continued)

OTHER PUBLICATIONS

International Search Report for PCT/US2015/066377, the international counterpart to U.S. Appl. No. 14/972,994.

(Continued)

*Primary Examiner* — Betelhem Shewareged
(74) *Attorney, Agent, or Firm* — Warner Norcross + Judd LLP (57) ABSTRACT

A cover includes a wear detection component. The wear detection component includes a wear layer and a visual wear indicator. The wear layer is designed and configured to reduce its thickness to a threshold thickness, or to disintegrate, after a preselected number of cleanings have been experience by the cover. The visual wear indicator is configured to indicate to the user that the cover has been through a threshold number of cleanings. When the wear layer has reduced its thickness to the threshold thickness, or has disintegrated, the wear layer reveals the visual wear indicator, indicating to the user that the cover is ready for replacement.

20 Claims, 7 Drawing Sheets

(51) Int. Cl.
*B32B 27/40* (2006.01)
*B32B 27/36* (2006.01)
*B32B 27/08* (2006.01)

(52) U.S. Cl.
CPC .......... *B32B 27/322* (2013.01); *B32B 27/365* (2013.01); *B32B 27/40* (2013.01); *B32B 2255/10* (2013.01); *B32B 2255/26* (2013.01); *B32B 2307/40* (2013.01); *B32B 2307/726* (2013.01); *B32B 2479/00* (2013.01)

(58) Field of Classification Search
CPC ............ B32B 2255/10; B32B 2255/26; B32B 2307/40; B32B 2307/726; B32B 2479/00
USPC ........................................................ 428/213
See application file for complete search history.

(56) References Cited

U.S. PATENT DOCUMENTS

| | | | |
|---|---|---|---|
| 4,826,479 A | 5/1989 | Burgin et al. | |
| 4,935,260 A | 6/1990 | Shlenker | |
| 5,045,341 A | 9/1991 | Shlenker | |
| 5,058,088 A | 10/1991 | Haas et al. | |
| 5,064,440 A | 11/1991 | Howard et al. | |
| 5,135,792 A | 8/1992 | Hogan | |
| 5,335,373 A | 8/1994 | Dangman | |
| 5,364,132 A | 11/1994 | Haas et al. | |
| 5,446,705 A | 8/1995 | Haas et al. | |
| 5,549,924 A | 8/1996 | Shlenker et al. | |
| 5,602,804 A | 2/1997 | Haas | |
| 5,603,161 A * | 2/1997 | Welsh ................. B26B 21/4087 30/346.52 | |
| 5,633,835 A | 5/1997 | Haas et al. | |
| 5,699,326 A | 12/1997 | Haas et al. | |
| 5,715,215 A | 2/1998 | Haas et al. | |
| 5,719,828 A | 2/1998 | Haas et al. | |
| 5,785,354 A | 7/1998 | Haas | |
| 5,862,101 A | 1/1999 | Haans et al. | |
| 5,873,606 A | 2/1999 | Haas et al. | |
| 5,923,001 A | 7/1999 | Morris et al. | |
| 5,930,206 A | 7/1999 | Haans et al. | |
| 5,957,458 A | 9/1999 | Haas et al. | |
| 6,026,818 A | 2/2000 | Blair et al. | |
| 6,390,908 B1 | 5/2002 | Chen et al. | |
| 6,452,873 B1 | 9/2002 | Holt et al. | |
| 6,778,090 B2 | 8/2004 | Newham | |
| 6,796,096 B1 | 9/2004 | Heath | |
| 7,008,310 B2 | 3/2006 | Andres | |
| 7,120,952 B1 | 10/2006 | Bass et al. | |
| 7,784,508 B2 | 8/2010 | Kemp et al. | |
| 8,050,814 B2 | 11/2011 | Rains et al. | |
| 8,501,103 B2 | 8/2013 | Bangera et al. | |
| 8,715,248 B2 | 5/2014 | McKinnon | |
| 8,747,775 B2 | 6/2014 | Sandvick | |
| 8,870,083 B2 | 10/2014 | Myers et al. | |
| 8,939,379 B2 | 1/2015 | Myers et al. | |
| 10,758,440 B2 | 9/2020 | Phipps et al. | |
| 2003/0006762 A1 | 1/2003 | Clements | |
| 2004/0191118 A1 | 9/2004 | Mody | |
| 2006/0241399 A1 | 10/2006 | Fabian | |
| 2007/0125392 A1 | 6/2007 | Olson, Jr. et al. | |
| 2007/0247318 A1 | 10/2007 | Pempsell et al. | |
| 2007/0285249 A1 | 12/2007 | Blair et al. | |
| 2009/0012418 A1 | 1/2009 | Gerlach | |
| 2009/0301382 A1 | 12/2009 | Patel | |
| 2010/0190004 A1 | 7/2010 | Gibbins et al. | |
| 2012/0135527 A1 | 5/2012 | Bangera et al. | |
| 2016/0294040 A1 | 10/2016 | Blair | |
| 2019/0056377 A1* | 2/2019 | Patmore ............. G01N 15/0826 | |
| 2021/0030173 A1* | 2/2021 | Ross ........................ A47G 9/02 | |

FOREIGN PATENT DOCUMENTS

| | | |
|---|---|---|
| DE | 69511563 T2 | 3/2000 |
| JP | 57101737 A | 6/1982 |
| JP | 06280499 A | 10/1994 |
| JP | 10281918 A | 10/1998 |
| JP | 2001115607 A | 4/2001 |
| JP | 2008082716 A | 4/2008 |
| WO | 9839164 A1 | 9/1998 |
| WO | 9853984 A1 | 12/1998 |
| WO | 0111332 A2 | 2/2001 |

OTHER PUBLICATIONS

International Written Opinion for PCT/US2015/066377, the international counterpart to U.S. Appl. No. 14/972,994.

* cited by examiner

COVER WITH WEAR DETECTION PROPERTIES

This application claims the benefit of U.S. Prov. App. Ser. No. 62/881,109, entitled COVER WITH WEAR DETECTION PROPERTIES (P-627), filed on Jul. 31, 2019, owned by Stryker Corporation of Kalamazoo, Mich., and which is incorporated by reference in its entirety herein.

TECHNICAL FIELD AND BACKGROUND

The present disclosure relates to a cover that includes a feature for visually indicating that the cover is approaching the end of its useful life before there is a liquid breach of the cover. The cover is suitable for use as a barrier in many applications where liquid penetration is undesired.

In some applications, covers are formed from impermeable material and are intended to protect areas, objects, or people from coming into contact with a liquid. These covers have been made from flexible fabric with a flexible liquid proof coating, such as polyvinyl chlorides ("PVCs") or polyurethanes. Over time, the covers wear and the coatings can lose their ability to prevent entry of a liquid into the protected area, or onto protected objects or people.

These covers are known to fail as barriers in a number of ways. Some failure modes are obvious, such as large cracks or tears in the cover, or a visible delamination of the coating. Other failure modes are less observable. Current methods of inspection of a cover for its integrity are reactive and identify a failure only after liquid is able to fully breached the cover.

SUMMARY

Accordingly, the present disclosure provides a cover with a wear detection component that provides a visual indication when the cover has reached a threshold level of wear to indicate that the cover is approaching the end of its useful life. By indicating when a threshold level of wear has been experienced by the cover, before a failure actually occurs, the wear detection component can help prevent a liquid breach of the cover.

One embodiment a cover includes a base layer and a wear detection component that is secured to the base layer. The wear detection component includes a wear layer where at least a portion of the wear layer is designed and configured to reduce its thickness to a threshold thickness, or to disintegrate, after a preselected number of cleanings, such as washings or wipings, have been experience by the cover. The wear detection component or the base layer also includes a visual wear indicator configured to indicate to the user that the cover has been through a threshold number of cleanings. When the wear layer has reduced its thickness to the threshold thickness, or has disintegrated, the wear layer reveals the visual wear indicator, which indicates to the user that the cover is ready for replacement.

In one embodiment, the base layer is formed from a first material that has a first thickness, and the wear layer is formed from a second material that has a second thickness. In one embodiment, the thickness of the wear layer is less than the thickness of the base layer. In other embodiment, the wear layer thickness is the same as the base layer thickness. In yet another embodiment, the wear layer thickness is greater than the base layer thickness.

In another embodiment, a cover includes a base layer and a wear detection component. The wear detection component includes a wear layer, which is designed and configured to reduce its thickness to a threshold thickness, or to disintegrate, after a preselected number of cleanings. When subject to the preselected number of cleanings, the wear layer reveals a visual wear indicator, which indicates that the cover is ready for replacement.

In one embodiment, the base layer is formed from a first material, and the wear layer is formed from a second material, which is different from the first material.

In one embodiment, the wear layer is thinner than the base layer.

In one embodiment, the wear layer includes first and second layers. The first layer is formed from the second material and forms the exterior surface of the wear layer. The second layer is disposed between the first layer and the base layer and includes the visual wear indicator. When the first layer has reduced its thickness to the threshold thickness, or has disintegrated, the visual wear indicator is revealed.

In another embodiment, the visual wear indicator includes a color, which is not visible until the first layer has reduced its thickness to the threshold thickness or has disintegrated.

In another embodiment, the visual wear indicator is formed by a color with a color intensity, and the color intensity is not visible until the first layer has reduced its thickness to the threshold thickness or has disintegrated.

According to any of the previous embodiments, the cover includes a reference layer formed from a material, which is more durable than either the base layer or the wear layer. The reference layer has a color with a color intensity, which is the same as the color and color intensity of the visual wear indicator. Therefore, as the cover is cleaned and the wear layer thins or disintegrates, a user can check to see if the color and color intensity of the reference layer matches the color and color intensity of the wear detection component, which indicates when the cover has been through the preselected number cleanings and, therefore, is ready for replacement.

In yet another embodiment, the visual wear indicator is formed by a reagent that changes color in response to a cleaning chemical. The reagent changes color when the first layer has reduced its thickness to the threshold thickness or has disintegrated.

In any of the foregoing embodiments, the thickness of the wear layer is in a range of about 50% to 75% of the thickness of the base layer, optionally in a range of about 55% to 70% of the base layer, and further optionally in a range of about 60% to 65% of the base layer.

In one embodiment, the base layer includes the visual wear indicator that indicates, when visible, that the cover has been through a threshold number cleanings, and therefore, is ready for replacement. According to one embodiment, the visual wear indicator is applied to the base layer, for example by printing or coating an image or color on or in the base layer.

In any of the foregoing embodiments, when the wear layer is formed from two layers, the first layer of the wear layer is at least liquid semi-permeable, and optionally liquid impermeable. The second layer includes a reagent that over time changes color in response to a cleaning chemical. For example, the first layer may be translucent, thus when the reagent changes color, the color indicates that the cover has been through the preselected number of cleanings and is, therefore, ready for replacement.

In one embodiment, the wear detection component is in the form of a patch, which is either integrally formed with the cover (for example by welding or gluing) or releasable attached to the cover, for example, by a releasable fastener, such as snaps, hook and loop fasteners, or by a tether, such as a lanyard.

In one embodiment, a patch for applying to the cover for indicating when the cover has reached a threshold level of wear is provided. The patch includes a wear layer and a visual wear indicator. At least a portion of the wear layer is designed and configured to reduce its thickness to a threshold thickness, or to disintegrate, after a preselected number of cleanings. When applied to the cover, the visual wear indicator is configured to indicate that the cover has been through a threshold number of cleanings and is ready for replacement. When the wear layer has reduced its thickness to the threshold thickness or has disintegrated, the wear layer reveals the visual wear indicator. The patch can be affixed to the cover by any suitable means, including welding, adhesion, snaps, hook and loop fasteners, rivets, sewing, heat and pressure, or a tether, such as a lanyard, or the like.

In another embodiment, the wear detection component includes multiple strips of material. Each strip may be formed from a different material so that the strips wear differently for different cleaning chemicals. In another embodiment, the strips may be made from the same material, but as they wear, they uncover visual wear indicators provided underneath the strips, which are formed from different reagents that react to different cleaning materials.

In one embodiment, a method of indicating when a cover has reached a threshold level of wear is provided. The method includes providing the cover with a wear detection component. The wear detection component includes a visual wear indicator and a wear layer. At least a portion of the wear layer is designed and configured to reduce its thickness to a threshold thickness, or to disintegrate, after a preselected number of cleanings. The method also includes securing the wear detection component to the base layer. When at least a portion of the wear layer has reduce its thickness to the threshold thickness, or has disintegrated, the wear layer reveals the visual wear indicator.

Any of the foregoing embodiments may be provided as a wear detection component for a cover for a mattress, a cover used as a protective garment, a cover for another type of cushion, such as a seat or a pad, or a cover for equipment.

These and other objects, advantages, and features of the disclosure will be more fully understood and appreciated by reference to the description of the current embodiment and the drawings.

Before the embodiments of the disclosure are explained in detail, it is to be understood that the disclosure is not limited to the details of operation or to the details of construction and the arrangement of the components set forth in the following description or illustrated in the drawings. The disclosure may be implemented in various other embodiments and may be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the disclosure to any specific order or number of components. Nor should the use of enumeration be construed as excluding from the scope of the disclosure any additional steps or components that might be combined with or into the enumerated steps or components.

DESCRIPTION OF THE EMBODIMENTS

Figure 1:
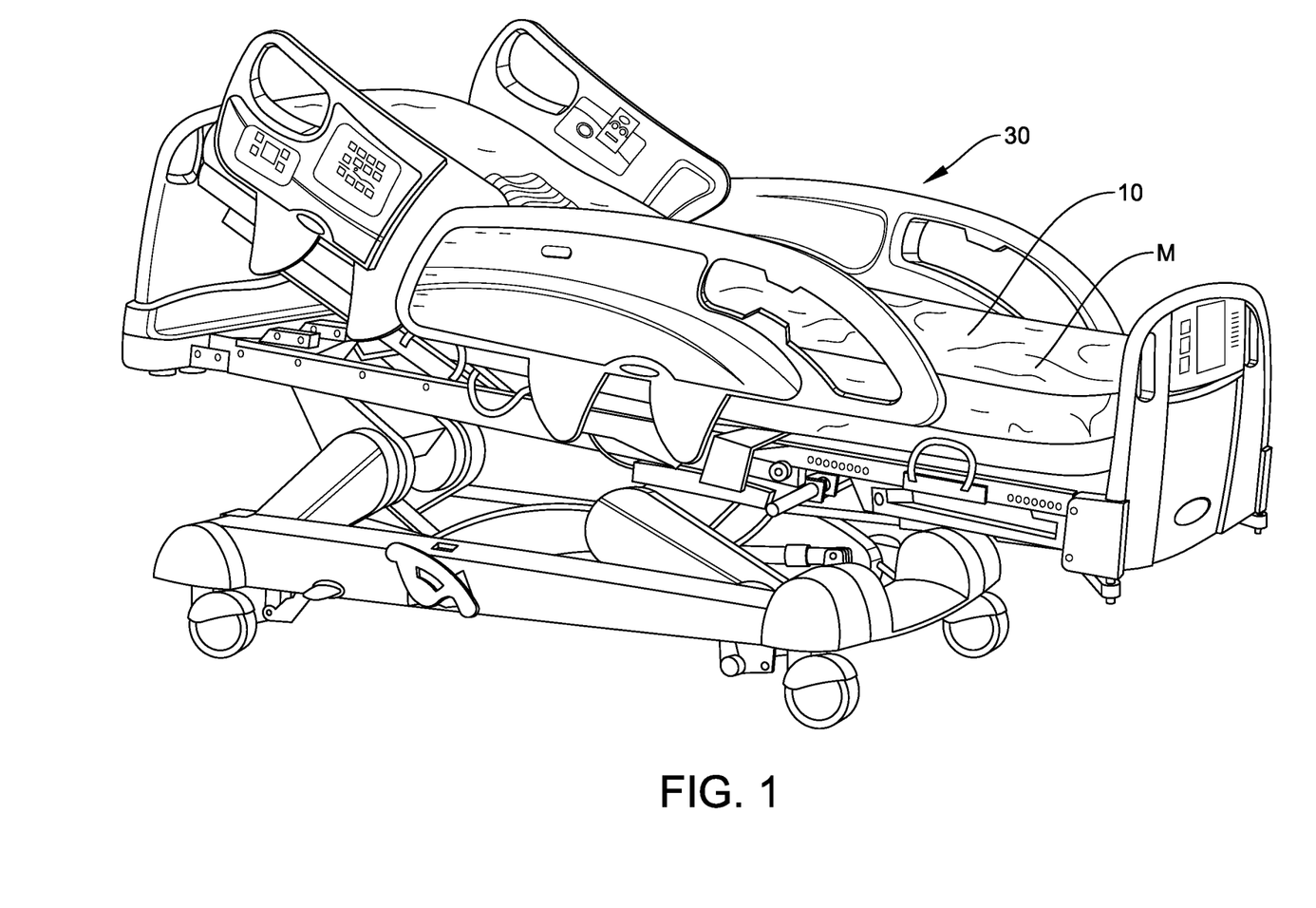
FIG. 1 is a perspective view of one embodiment of a patient support apparatus including a cover with a wear detection component.
Figure 2:
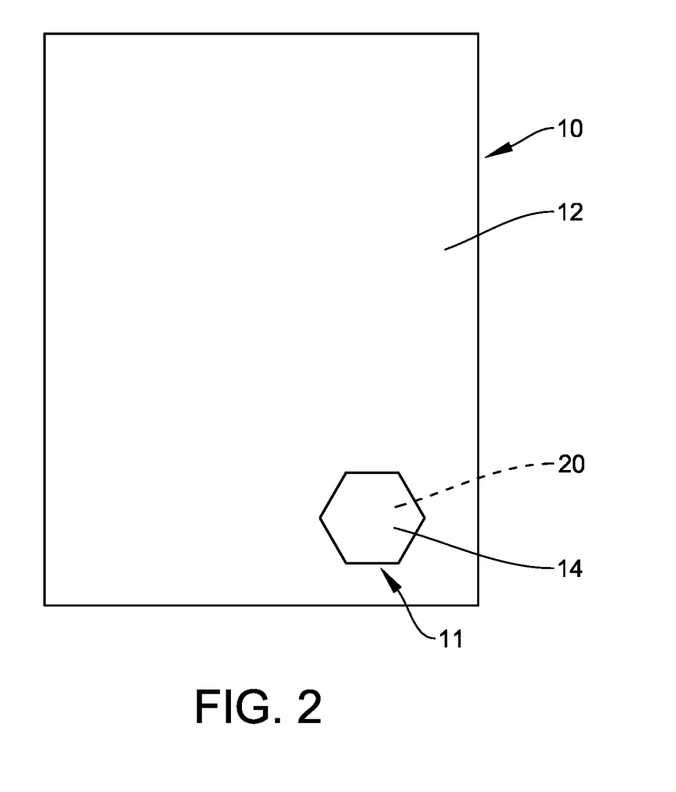
FIG. 2 is a schematic plan view of the cover and a wear detection component.
Figure 2A:
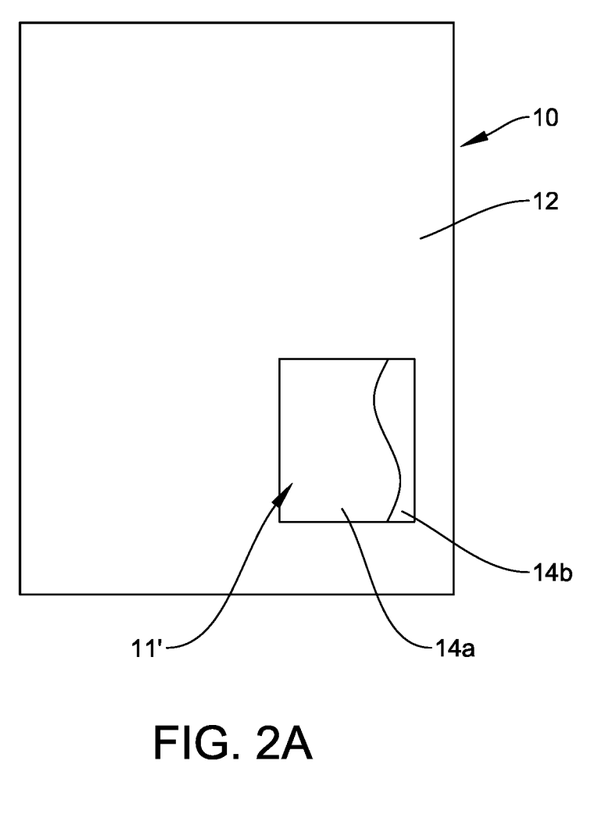
FIG. 2A is a schematic plan view of the cover and another embodiment of a wear detection component.

Referring to FIGS. 1 and 2, the numeral 10 generally designates a cover. As will be more fully described below, the cover 10 may comprises a cover for a patient support apparatus. While described as a "patient" support apparatus, it should be understood that "patient" is to be construed broadly to include not only people undergoing medical treatment but also invalids and other persons, such as long-term care persons, who may need assistance or care but who may or may not be undergoing medical treatment. Further, although the particular form of the patient support apparatus illustrated in FIG. 1 is a bed adapted for use in a hospital or other medical setting, it will be understood that the patient support apparatus could, in different embodiments, be a cot, a stretcher, a recliner, a wheelchair, or any other mobile structure capable of supporting a patient in a healthcare environment, or a residential bed.

Figure 3:
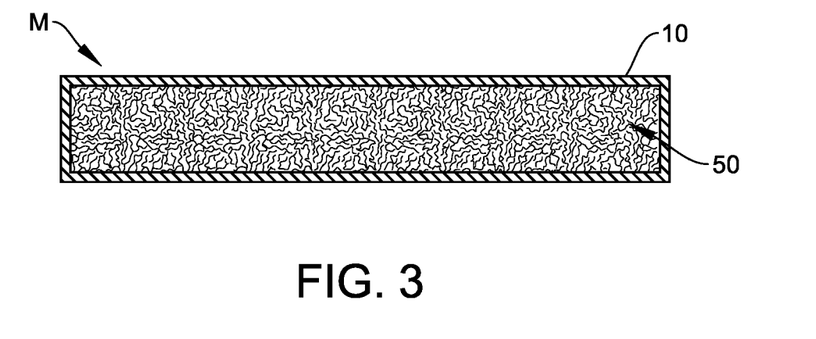
FIG. 3 is a schematic diagram of a mattress and the cover.

Referring again to FIG. 1, in the illustrated embodiment cover 10 is configured as a mattress cover for a mattress M on patient support apparatus 30, which may surround the internal components 50 of a mattress M (FIG. 3). As would be understood, cover 10 may be used to protect the internal components 50 of the mattress M from liquid contamination in order to avoid spoiling of the internal components 50 and/or to avoid the spread of pathogens in liquid that could be deposited on the mattress M. As will be more fully described below, cover 10 includes wear detection component 11 that provides a visual indication when the cover 10 is approaching the end of its life and is ready for replacement, which can help prevent failure, including a liquid breach of the cover 10. The wear detection component 11 can be located anywhere on the cover 10 but may be located in a location on the cover where it is easily visible to a caregiver and where there would be the most, or at least a significant amount of, exposure to wear. For example, locating the wear detection component 11 to the upper surface of the cover 10, such as at the foot end, would likely expose it each disinfectant cycle and wear (and would get more exposure than the bottom or side of the cover 10), as well as be easily viewable by a caregiver.

In the illustrated embodiment, cover 10 forms a base layer 12 with wear detection component 11 mounted to the base layer 12. As noted, wear detection component 11 is configured to indicate that the cover 10 has been through a threshold number of cleanings, such as washings or wipings, and, therefore, is ready for replacement. Optionally, the wear detection component 11 may be cover a small section (such as a few square inches, e.g. 1 inch×2 inch area) or substantially the whole side of the cover (in this manner the whole side becomes the base layer 12 or a majority of the base layer 12) instead of covering a smaller area, as illustrated in the drawings.

Wear detection component 11 may be formed with the cover or post applied (after the cover is formed), such as by integrally conforming wear detection component 11 to the cover 10, including by welding, adhesively bonding, or otherwise adhering wear detection component 11 to cover 10, or attaching wear detection component to cover 10 by a releasable mechanism, as will be more fully described below.

Figure 4:
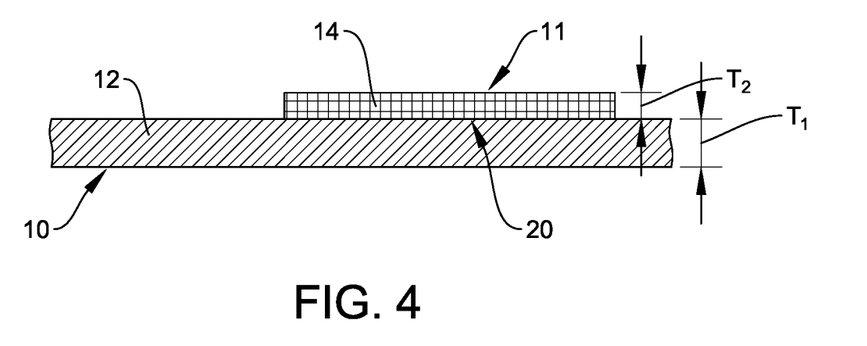
FIG. 4 is an enlarged schematic diagram side view of a portion of the cover, including a base layer and a wear detection component.

Referring to FIGS. 2-4, in the illustrated embodiment, wear detection component 11 is mounted to a base layer 12, which is formed from a portion of the cover 10, and is formed of a material, such as a liquid impermeable or semi-impermeable material, having a thickness T1. Examples of suitable materials for the wear component 11 include unreinforced or reinforced flexible polymers, such as polyurethane (PU), polyvinylchloride (PVC), polycarbonate (PC), or combinations thereof, butyl rubber, or a polytetrafluoroethylene (PTFE), to name a few. The polymers may be extruded, rolled, dipped polymers, or polymers, which are formed into sheets of material. Further, as noted below, wear detection component 11 may be made from multiple layers, where one or more of the layers may be constructed of synthetic or natural fabric, extruded, woven, nonwoven, and/or reinforced materials. Examples of suitable materials for the base layer 12 and/or cover 10 include polyurethane (PU), polyvinylchloride (PVC), polycarbonate (PC), or combinations thereof, or a polytetrafluoroethylene (PTFE), such as expanded polytetrafluoroethylene (EPTFE) (suitable for an interior layer) One suitable material that is a commercially available product is Tyvek®.

In one embodiment, the wear detection component 11 includes a wear layer 14, which is selected so that it wears (e.g. thins or disintegrates) faster than the underlying cover (e.g. through material selection or material thickness), and a visual wear indicator 20, which, when revealed or uncovered by the thinning or disintegrating the wear layer 14, indicates that the cover 10 has been through a threshold number of cleanings and, therefore, is ready for replacement.

In one embodiment, the wear layer 14 is formed from a material that is different than the material of the base layer 12. In another embodiment, the wear layer 14 is formed from the same material as the base layer 12. In yet another embodiment, the wear layer 14 is formed from a similar material as the base layer 12. Therefore, the mechanism that results in the wear layer 14 thinning or disintegrating may be the material selection or its construction, as noted below. Optionally, the wear layer may be a membrane, such as an ink polymer, which may be applied to the base layer 12, such as by spraying or coating.

As noted, the materials of the wear layer 14 and the base layer 12 may be the same, similar, or may be different. In one embodiment, the thickness T2 of the wear layer 14 is less than the thickness T1 of the base layer 12. For example, the thickness T2 of the wear layer 14 can be in a range of about 50% to 75% of the thickness T1 of the base layer 12, and optionally in a range of about 55% to 70% of the thickness T1, and further optionally about in a range of about 60% to 65% of the thickness T1. As would be understood the thinner the wear layer, the less durable the wear layer (when referring to a layer made of the same or less durable material than the base). In this manner, thinner layers are less durable and wear and/or disintegrate more quickly than a thicker version of the layer made of the same material.

Figure 5:
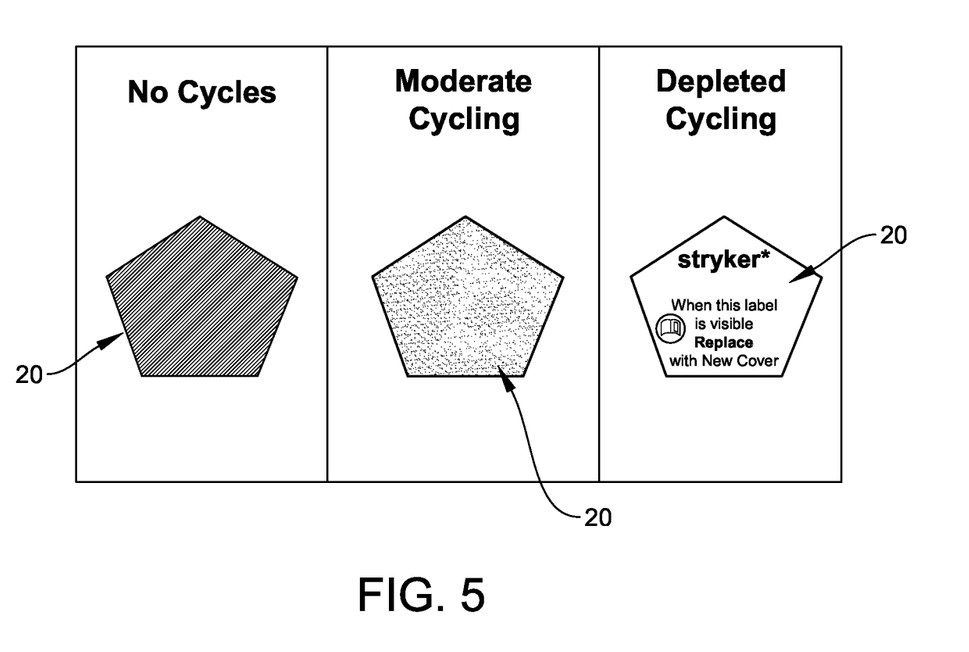
FIG. 5 is an enlarged schematic diagram of the wear detection component, illustrating increasing levels of wear of a wear layer, ultimately indicating that the cover has reached a threshold level of wear and is ready for replacement.

As illustrated in FIG. 5, at least a portion of the wear layer 14 is designed and configured to reduce its thickness to a threshold thickness or to disintegrate after a preselected number of cleanings have occurred. The visual wear indictor 20, on the other hand, may be provided by a separate layer or can be included on or in either the base layer 12 or the wear layer 14.

In one embodiment, the visual wear indicator 20 is included on the base layer 12, under the wear layer 14. As the cover 10 is laundered and used under normal use, the wear layer 14 becomes thinner and thinner, and in some cases may disintegrate. Once the wear layer 14 is reduced to a threshold thickness, the wear layer 14 is thin enough to reveal or uncover the visual wear indicator 20 to allow a user to see the visual wear indicator 20 disposed under the wear layer 14 (see e.g. FIG. 5). As noted, the wear layer 14 may become thin enough that it essentially disintegrates, so that the wear layer 14 is no longer covering and concealing the visual wear indicator 20, allowing a user to clearly see the visual wear indicator 20 thereunder (see FIG. 5 far right example). Being able to see the visual wear indicator 20 indicates to the user that the cover 10 is ready for replacement.

The visual wear indicator 20 can be included on the base layer 12 in a variety of ways. For example, the visual wear indicator 20 may be printed onto the base layer 12. For example, the visual wear indicator 20 can be directly or indirectly printed onto the base layer 12, or printed directly or indirectly into the base layer 12, using, for example, dye sublimation printing. The visual wear indicator 20 may not be a discreet or separate layer, therefore, and may be formed within or on the base layer, including when printed. Similarly, the visual wear indicator may be the color of cover itself. Thus, when the wear layer 14 has sufficiently thinned that the color of the cover beneath the wear layer is visible (e.g. including when the wear layer 14 is gone) this can be used to provide an indication that the cover is ready for replacement.

In another embodiment, the visual wear indicator 20 may be similarly formed on or in the underside of the wear layer 14 (the side facing the cover).

In another embodiment described below, the wear layer 14 may be formed from multiple layers with the visual wear indicator 20 being formed in or on one of the underlying layers of the wear layer 14, including the surface facing the base layer 12, as noted. For example, the visual wear indicator 20 could be printed or sprayed onto one of the layers (or printed in one of the layers), added as a coating to one of the layers, or be provided as a thin layer or a membrane between two of the layers.

Referring to FIG. 5, the visual wear indicator 20 may be fully covered and obscured when the cover 10 is new and has experienced no cleanings, and the wear layer 14 is at its original thickness, so that a user cannot see the visual wear indicator 20. Alternately, the visual wear indicator 20 may start out being only partially obscured before any thinning of the wear layer 14.

Referring to the center illustration in FIG. 5, as noted, the visual wear indicator 20 may be partially obscured before the cover has experienced a moderate number of cleanings, or after the wear layer 14 has experienced some thinning so that the visual wear indicator 20 is partially revealed before reaching the threshold number of cleanings. Referring to the right-most illustration in FIG. 5, the wear indicator 20 may be clearly visible when the wear layer 10 has been reduced to its threshold thickness (or disintegrated) and no longer covers or conceals, and instead reveals, the visual wear indicator 20, which visually indicates that the cover 10 is ready to be replaced. As such, the visual wear indicator may include symbols or words, such as "REPLACE WITH NEW COVER".

In another embodiment, the wear layer 14 may by formed from a colored material so that as the wear layer 14 wears through, the color will disappear, which can be used to indicate the cover needs to be changed. For example, as noted above, the wear layer 14 may be formed by spraying or coating base layer 12 with a polymer, such as a polymer with a color, including for example an ink polymer. Therefore, the wear layer 14 may form the visual wear indicator 20, or be applied to the base layer 12 over the visual wear indicator 20, so that again, the wear detection component 11 is integrally formed with the base layer 12.

Figure 6:
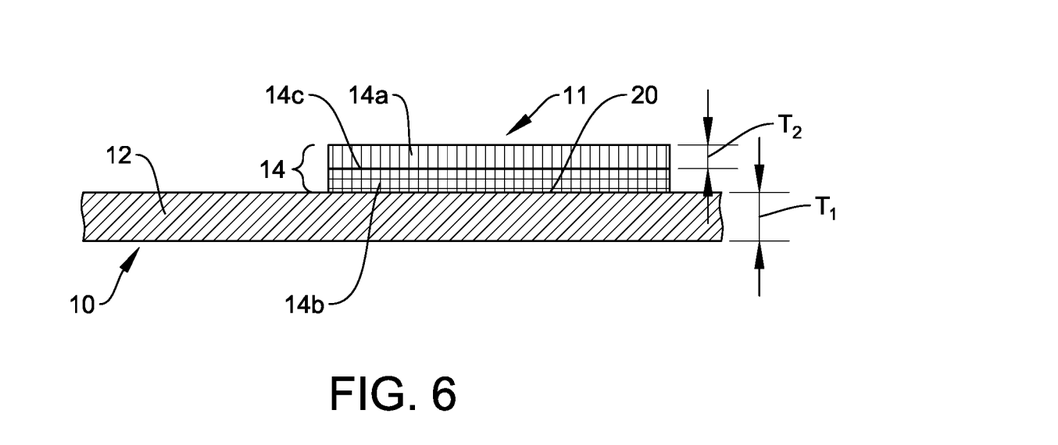
FIG. 6 is an enlarged schematic diagram side view of a portion of a second embodiment of a cover, including a base layer and a wear detection component comprising first and second layers.

Referring to FIG. 6, in another embodiment, the wear layer 14 can be assembled from one or more layers. In the illustrated embodiment, wear layer 14 is formed from at least two layers—first and second layers 14a, 14b assembled together and applied on top of the base layer 12 and attached thereto by, for example, welding, stitching, adhesively bonding, or as described below by releasably attaching. The first layer 14a can be formed from one material, such as noted above, and defines an exterior surface of the wear layer 14. The second layer 14b may be formed from the same or different material, and is disposed between the first layer 14a and the base layer 12. First layer 14a may be secured to second layer 14b, which is then secured to the base layer 12 over the visual wear indicator 20. Alternately, first layer 14a may be slightly larger than the second layer and secured directly to the base layer 12 over the second layer 14b and the visual wear indicator 20.

In one embodiment, the second layer 14b may include or form the visual wear indicator 20. When the first layer 14a has reduced its thickness to the threshold thickness or disintegrated, the second layer 14b is revealed to provide the visual indication of wear. For example, the second layer 14b may have a selected color that is concealed until the first layer 14a has reduced its thickness to the threshold thickness or has disintegrated. Optionally, the second layer 14b can have a color with a selected color intensity, which is concealed until the first layer 14a has reduced its thickness to the threshold thickness or disintegrated. When the user is able to see the color, or the intensity of the color, this can indicate to the user that the cover 10 is ready to be replaced.

In another embodiment, the wear detection component 11 may include a single layer wear layer 14, which may be applied on top of the base layer 12. The base layer 12 may have a selected color, pattern, or visual wear indicator that is concealed until the wear layer 14 has reduced its thickness to the threshold thickness or disintegrated. When the wear layer 14 has reduced its thickness to the threshold thickness or disintegrated, the base layer 12 is revealed to provide the visual indication of wear.

In one embodiment, the visual wear indicator 20 may be an image printed on an upper surface 14c of the second layer 14b, with the upper surface 14c facing the first layer 14a so that the second layer 14b becomes the visual wear indicator. Again, as the first layer 14a is worn or disintegrated, the visual wear indicator 20 is revealed and viewable by the user.

The color selected for the second layer 14b (or any of the visual wear indicators) can be a bright color. Optionally, the color used for the wear detection component 11 can be orange, yellow, including a neon yellow, red, blue, green, or another highly visible, noticeable, bright color. Of course, any other color could be used as desired.

As noted, suitable materials for the first or second layers 14a, 14b can include unreinforced or reinforced flexible polymers, such as polyurethane (PU), polycarbonate (PC), polypropylene (PP), alloys or blends thereof, or polytetrafluoroethylene (PTFE), butyl rubber. Further, where the wear layer comprises a single layer, the wear layer may be formed from an ink, such as an ink polymer. Further, any of the layers and materials disclosed herein may be unreinforced or reinforced.

For example, in one embodiment, the wear layer may be made from a first top layer of PU and a second layer of PTFE. However, it should be understood that the material of the second layer 14b, especially when forming the visual wear indicator 20, may not be important because its wear characteristics as an underlying layer may not impact the overall performance of the wear detection component 11, especially when the first or outer layer 14a is mounted directly to the base layer 12 of the cover 10 rather than through the second layer.

Figure 9:
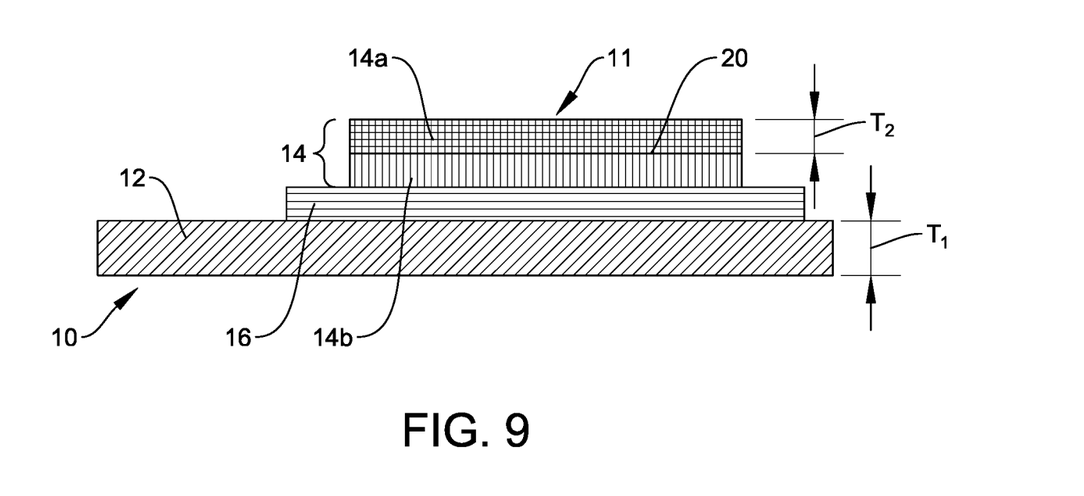
FIG. 9 is an enlarged schematic diagram side view of a portion of a third embodiment of a cover, including a base layer, a wear detection component comprising first and second layers, and a reference layer.

Optionally or alternatively, the cover 10 may include a reference layer 16 formed from a third material, as illustrated in FIG. 9. The reference layer 16 provides a layer that can be referenced and compared to in order to determine wear. To that end, and to maintain the integrity of the reference layer 16, the material forming the reference layer 16 may be more durable than both of the materials of the wear layer and the cover. In one embodiment, the reference layer 16 has a color with a color intensity that is the same as the color and color intensity of the visual wear indicator 20. The increased durability of the reference layer 16 means it will retain its color intensity during cleanings so that a user can compare the color intensities of the wear detection component 11, i.e. the visual wear indicator 20 and the reference layer 16, to determine if color intensity of the wear detection component 11 matches the color and intensity of the reference layer 16, indicating that the cover 10 has been through the preselected number or cleanings and, therefore, is ready for replacement.

In one embodiment, referring to FIG. 9, the reference layer 16 can be formed by a layer that underlies the wear detection component 11 but which extends beyond the perimeter (at least on one side) of the wear detection component 11. In this manner, reference layer 16 is immediately adjacent the wear layer 14 to provide an easy comparison of the colors.

Alternatively, the reference layer 16 can be secured to the base layer 12 separate from by adjacent the wear layer 14.

In this case, the relative size of the wear layer 14 and reference layer 16 may be selected as desired.

In yet another embodiment, optionally, the wear layer 14 (such as outer layer 14a) can have a brighter or increased color and color intensity relative to the reference layer 16. A user can compare the color intensities of the wear layer 14 and the reference layer 16 to determine if the color intensity of the wear layer 14 has been decreased to substantially the same color intensity as the reference layer 16, therefore indicating that the cover 10 is ready for replacement.

Further, optionally or alternatively, the wear detection component 11 may include a reagent that changes color when exposed to, for example, cleaning products or when exposed to other liquids, such as water or bodily fluids. For example, the reagent may be applied to the underside of the wear layer 14 or to the top surface or incorporated into the second layer 14b. Similarly, the reagent may be applied to the top surface of base layer 12.

For example, suitable reagents may be selected from materials that exhibit a first color prior to contact with a liquid, such as a cleaning fluid, water, or a bodily fluid, and exhibit a second, different color after contact with the liquid. The cleaning material may be a cleaning material, such as bleach, hydrogen peroxide ($H_2O_2$), and/or an ammonia solution, that is applied during a routine cleaning session or may be applied at any time an inspection of the cover 10 is desired. The reagent can be a reagent, such as a fluorogenic substrate, e.g. Amplex™ Red (which turns red when it encounters hydrogen peroxide), litmus paper, or pH sensitive dye.

When the wear layer 14, such as the first layer 14a, has disintegrated or reduced its thickness to the threshold thickness, the liquid may penetrate the remaining portion of the wear layer and make contact with the reagent. Thus, the color change indicates that the liquid has penetrated the wear layer. It should be understood that like the color, the reagent can be included in, on, or between any of the various layers of material disclosed herein.

For example, when the wear detection component 11 is formed from two or more layers, the color change elicited by the reagent may be in response to the liquid passing through the wear layer 14a and contacting the second layer 14b. In one embodiment, the first layer 14a may be transparent so that the color change is visible there through after the threshold thickness has been reached and the layer has disintegrated sufficiently to become permeable. Additionally, more than one reagent may be associated with the second layer 14b (or base layer 12) and located in discrete areas of the second layer (or base layer 12). For example, the reagents may be selected so they are each reactive to different chemicals, pH levels, or liquids. For example, the presence of the liquid in the visual detector indicator may be indicated by a color change in one or more reagents. If a protein is present in the liquid, a reagent intended to detect the protein may change color. If the liquid passing through the first layer 14a is expected to vary in pH, a litmus mixture may be the reagent in order to provide an indication of the pH of liquid that has entered the cover 10. Reagents capable of changing color based on pKa values, the presence of liquids containing amino acids, proteins, urine, other bodily or biological liquids, or water may also be present in one or more of the layer(s).

Reagents may include chemical indicators that change color as pH changes. Acid/base indicators may be visible as a first color under neutral conditions and visible as a second, different color at an acidic or basic pH. Two examples, Bromocresol Green (also known as 3',3", 5', 5"-tetrabromo-m-cresol-sulfonephthalein with a pH of 4.90) and Bromophenol Blue are blue at a neutral pH and transition through green to yellow as the pH decreases. Bromocresol Green transitions between pH values of about 5.4-3.8. Bromophenol Blue transitions between pH values of about 4.6-3.0. Another example is Phenolphthalein, which is clear at a neutral pH and transitions to red-violet at the pH increases. Phenolophthalein transitions between pH values of about 8.0 to about 9.8. Other examples include, but are not limited to, litmus, Nitrazine Strips, Bromothymol Blue, Methyl Orange, and Yamada Universal Indicator. Some reagents can be corrosive based, and could indicate exposure to bleach and hydrogen peroxide ($H_2O_2$), and other reagents can be solvent based and could detect polar solvents, e.g. isopropyl alcohol (IPA), ethanol, and glycol ethers.

Reagents that appear as one color when dry and a second, different color when wet can also be useful. For example, cobalt chloride is blue when dry and dark red when wet.

Reagents that luminesce may be desired if the cover 10 is intended for use in lower light settings. For example, some suitable chemiluminescent reagents may be diphenyl oxalate, which can be combined with a weak base (e.g., 2,4,6-trichlorophenol) and glows when wet. Various colors may be produced depending upon the dye added to the reagent. Other examples include lunimol and fluorescein.

The reagent associated with the layer(s) may be placed in the respective layer and, optionally, impregnated in a pattern. The pattern may be individual or interlaced shapes or designs, or may be letters that spell out one or more words to indicate the cover 10 is ready for replacement. Additional examples of using reagents are in disclosed in U.S. patent application Ser. No. 14/019,089 filed Sep. 5, 2013, U.S. patent application Ser. No. 16/112,027 titled "Composite Material with Failure Detection Properties" filed on Aug. 24, 2018 and incorporated herein by reference in its entirety.

In one embodiment, the wear layer 14 includes a first layer 14a that is translucent, with the second layer 14b including a reagent. Over time, the laundry or wiping chemical will pass through the wear layer 14a so that the reagent in the second layer 14b can change color in response to cleaning. For example, the first layer 14a may be semi liquid-permeable and become liquid permeable after cleaning a threshold number of times. The color change—due to the reagent in the second layer 14b—is then visible through the translucent first layer 14a, thus indicating that the cover 10 has been through the preselected number of cleanings and is ready for replacement.

In another embodiment, the wear layer 14 may be in the form of multiple bars or strips of material. The strips may be formed from the same materials described above in reference to wear layer 14. Additionally, the strips may be formed over a visual wear indicator or may form the visual wear indicator, similar to as described above. Thus, when worn the strips either reveal the underlying color or indicate the absence of the color to provide the wear indication. In one embodiment, the strips may have a reagent incorporated therein or thereunder, such as described above, which changes color to provide an indication that the cover is ready for replacement.

In another embodiment, each strip may be formed from a different material and/or have different reagent to determine different wear issues or characteristics—e.g., one strip may be sensitive to bleach, and other strips may be sensitive to hydrogen peroxide ($H_2O_2$), Phenolphthalein, and/or other cleaners, such as alcohol based cleaners, ethynol, and/or glycolic based cleaners. One example of a material for the strips includes polyurethane. A variety of polyurethane materials are feasible and can be selected for their varying levels of resistance to disinfectants and other cleaners and solvents mentioned herein. Polyurethane can be combined with other materials, such as polycarbonate, to add desirable characteristics to the material, such as to change the durability, softness, and flexibility.

As described more fully below, the wear detection component 11 may be separate from the cover (but can be post applied) and, further, be configured in the form of a tag, a label, a patch, or other suitable element (and is generally smaller than) that is secured to the cover. The wear detection component 11 can be mounted to or formed on the cover (e.g. on base layer 12) via any suitable method, including but not limited to sewing, adhesion, welding, or spraying or coating, and as such may be integrally mounted to or formed on the base layer 12 or as described below may be separate and mounted using a releasable fastener method.

Figure 7:
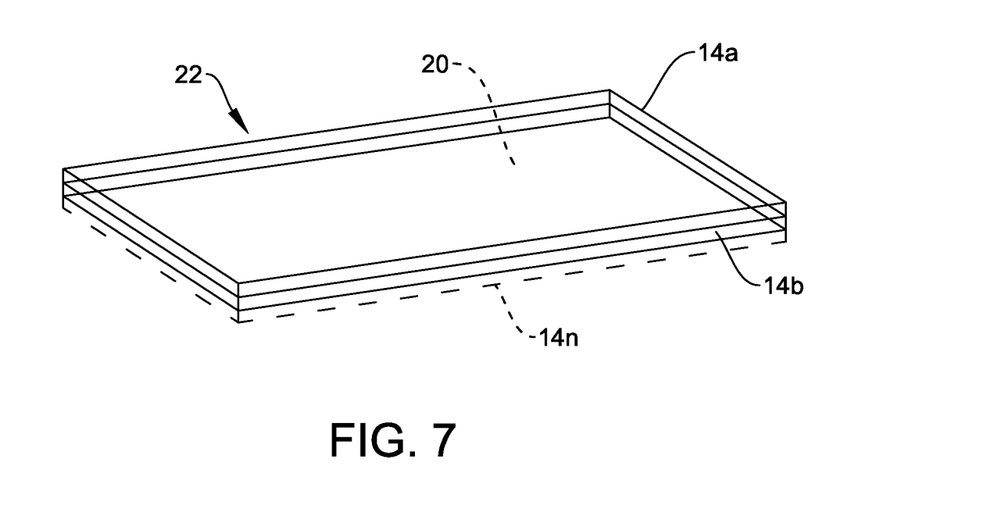
FIG. 7 is a schematic diagram of another embodiment of a wear detection component.

Referring to FIG. 7, in one exemplary embodiment, the wear detection component 11 is in the form of a separate or standalone indicator patch 22. The indicator patch 22 can be post attached to the cover (attached after the cover is formed) and mounted to the cover 10 by one or more fasteners, an adhesive, stitches, and including removable fasteners, such as hook and loop fasteners, snaps, and buttons in a selected location on the base layer 12, e.g. the upper side, such as the foot end, of the cover 10, which would be exposed to each cleaning and/or typically greater wear. In some embodiments, the indicator patch 22 may also include a two-layer wear layer 14 construction, with first and second wear layers 14a and 14b, similar to the wear detection component described above, with the visual wear indicator 20 being formed in or on one of the surfaces of the layers 14a or 14b so that the indicator patch 22 is a self-contained wear indicator component with an integral visual wear indicator. For further details of a suitable construction, reference is made to the above embodiments. Optionally, the indicator patch 22 can include additional layers 14n.

While the wear detection components 11 and 11' are illustrated as being a quadrilateral (FIG. 2) or rectangular (FIG. 2A) in shape, any other shape is contemplated herein also. The wear detection components described in may vary greatly in size and may extend over the entire upper surface of the cover, as noted, or may, also as noted, be configured to occupy a small section of the cover, such as a patch. In one embodiment, the patch may be approximately 1" (W)×2" (L) patch and can be made of any of the above disclosed suitable materials and mounted or formed with the cover, as noted above.

Figure 8:
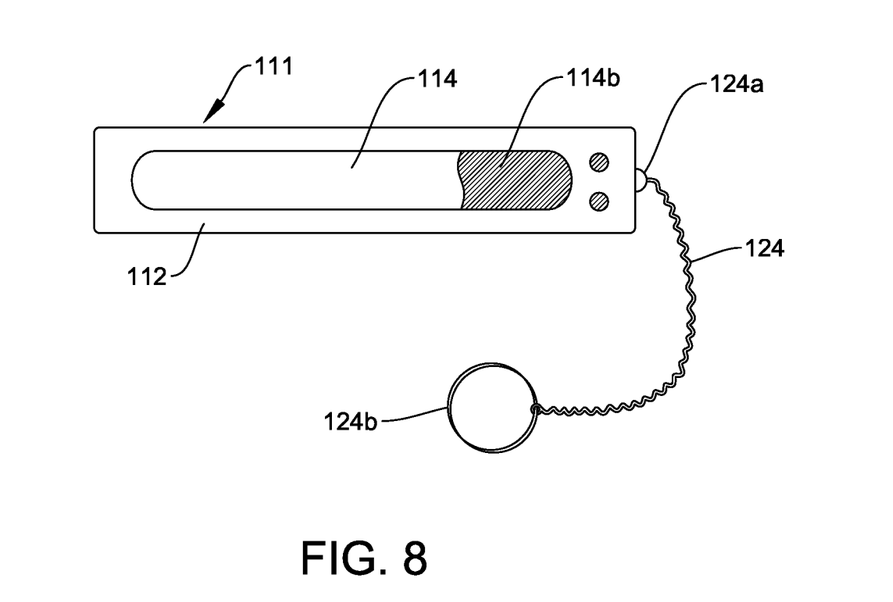
FIG. 8 is a schematic diagram of yet another embodiment of a wear detection component with a tether.

In another exemplary embodiment, a wear detection component 111 is secured to a cover 10 by a tether 124, an example of which is illustrated in FIG. 8. The tether 124 is configured to be loosely attached to the wear detection component 111 by a loop or ring 124a on one end and attached to cover 10 by a ring or loop 124b or other fastener on its other end. Suitable tethers include flexible cords, wires, strings, or chains. As described in the previous embodiments, the wear detection component 111 can include multiple layers, reagents, etc. and is configured to indicate that the cover has been through a threshold number of cleanings and is ready for replacement.

In one embodiment, wear detection component 111 includes a wear layer 114 mounted to a substrate 112, which forms a base layer. Wear layer 114 may be applied on substrate 112 over a visual wear indicator 114a, such as a color that is applied to or formed in the top surface of the substrate (or another layer beneath layer 114) so that when wear layer 114 wears out (thins, disintegrates, etc.), the color will be visible and, therefore, provide the wear indication similar to as noted above. The example illustrated in FIG. 8 shows a portion of the wear layer 114 partially removed, revealing the color 114b there below. For further optional construction of wear layer 114 and the visual wear indicators that may be employed when forming wear layer 114 and the visual wear indicators, reference is made to the above embodiments.

Directional terms, such as "vertical," "horizontal," "top," "bottom," "upper," "lower," "inner," "inwardly," "outer" and "outwardly," are used to assist in describing the disclosure based on the orientation of the embodiments shown in the illustrations. The use of directional terms should not be interpreted to limit the disclosure to any specific orientation(s).

Method

Figure 10:
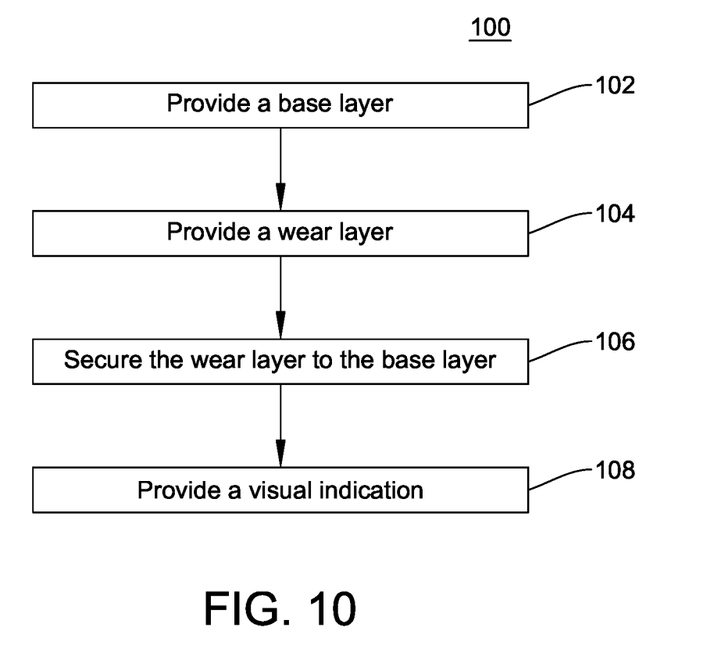
FIG. 10 is a flow diagram including steps of a method for indicating when a cover has reached a threshold level of wear.

In operation, indicating when the cover 10 has reached a threshold level of wear, as described above, can be accomplished by the method 100 shown in FIG. 10. At step 102, the method includes providing a wear indicator component on a cover, such as on a base layer, a portion of the cover or on a separate substrate that is mounted to the cover. Step 104 provides a wear detection component that includes a wear layer and a visual wear indicator under or in the wear layer. The visual wear indicator, when visible, indicates that the cover has been through a threshold number of cleanings and is ready for replacement. The wear layer is designed to reduce its thickness to a threshold thickness or to disintegrate after a preselected number of cleanings so that the visual wear indicator becomes visible, either revealed or uncovered. At step 106, the wear detection component is secured to the cover or base layer as discussed above. During normal use, the cover is subjected to a number of cleanings. As such, as the cover 10 is cleaned, etc., the wear layer gets thinner and thinner. At step 108, the method includes indicating to a user that the cover has reached a threshold level of wear when at least a portion of the wear layer has reduced its thickness to the threshold thickness or has disintegrated such that the wear layer reveals or uncovers the visual wear indicator.

Providing the wear layer at step 104 may include forming the wear layer from first and second layers, as described above. The first layer may be formed of the first material that forms the exterior surface of the wear layer 14. Optionally, the visual wear indicator may be formed in or on the second layer, such as, by forming the second layer with a color or color intensity (step 104). The color or color intensity of the second layer 14b can be concealed until the first layer 14a has reduced its thickness to the threshold thickness or has disintegrated, as described above.

Once a threshold thickness of the wear layer has been reached, or the wear layer has disintegrated, the visual wear indicator is revealed or uncovered, which indicates to the user that the cover 10 has been through a threshold number of cleanings and is, therefore, ready for replacement.

Construction or manufacturing methods for the materials may also include the steps of providing a reagent as the wear detection component.

The above description is that of current embodiments of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the described disclosure may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

We claim:

1. A cover comprising:
   a base layer;
   a wear detection component mounted to the base layer and including a wear layer having a thickness, at least a portion of said wear layer designed and configured to reduce its thickness to a threshold thickness or to disintegrate after a preselected number of cleanings indicating said cover is ready for replacement; and
   a visual wear indicator at least partially concealed by said wear layer before the cover has been subjected to the preselected number of cleanings, wherein when said cover has been through the preselected number of cleanings said wear layer reduces its thickness to the threshold thickness or has disintegrated and reveals said visual wear indicator to visually indicate said cover is ready for replacement.

2. The cover according to claim 1, wherein the base layer is formed from a first material having a first thickness, the wear layer is formed from a second material and has a second thickness, and the second material is the same as, similar to, or is different from said first material.

3. The cover according to claim 2, wherein the second thickness is less than the first thickness.

4. The cover according to claim 2, wherein said wear layer comprises first and second layers, said first layer being formed of said second material and forming an exterior surface of said wear layer, said second layer disposed between said first layer and said base layer, said second layer forming said visual wear indicator, wherein when said first layer has reduced its thickness to said threshold thickness or has disintegrated said visual wear indicator is revealed.

5. The cover according to claim 4, wherein said visual wear indicator includes a color, said color being concealed until said first layer has reduced its thickness to said threshold thickness or has disintegrated.

6. The cover according to claim 4, wherein said visual wear indicator includes a color with a color intensity, said color intensity being concealed until said first layer has reduced its thickness to said threshold thickness or disintegrated.

7. The cover according to claim 6, further comprising a reference layer formed from a third material, said third material being more durable than said first material and said second material, and said reference layer having a color with a color intensity the same as said color and color intensity of said visual wear indicator wherein a user can compare said color intensities of said visual wear indicator and said reference layer to determine when said cover has been through said preselected number of cleanings and is ready for replacement.

8. The cover according to claim 4, wherein said visual wear indicator includes a reagent, said reagent changing color in response to a cleaning chemical, said reagent changing color when said first layer has reduced its thickness to said threshold thickness or has disintegrated.

9. The cover according to claim 4, wherein said first layer comprises at least one material selected from the group consisting of PTFE material, PU material, PC material, PVC material, and PP material.

10. The cover according to claim 2, wherein said second thickness is (1) a range of 50% to 75% of said first thickness, (2) a range of 55% to 60% of said first thickness, or (3) about 55% of said first thickness.

11. The cover according to claim 1, wherein said base layer includes said visual wear indicator.

12. The cover according to claim 11, wherein said visual wear indicator is printed on or in said base layer.

13. The cover according to claim 4, wherein said first layer of said wear layer is at least liquid semi-permeable, and said second layer includes a reagent that over time changes color in response to a liquid or cleaning chemical, and said first layer being translucent wherein when said reagent changes color said color indicates said cover has been through said preselected number of cleanings and is ready for replacement.

14. A cover comprising:
   a wear detection component being mounted to said cover and including a wear layer having a thickness, at least a portion of said wear layer designed and configured to reduce its thickness to a threshold thickness, or to disintegrate, after a preselected number of cleanings; and
   a visual wear indicator at least partially concealed by said wear layer before the cover has been subjected to the preselected number of cleanings, wherein when said cover has been through the preselected number of cleanings said wear layer reduces its thickness to the threshold thickness or has disintegrated and reveals said visual wear indicator to visually indicate said cover is ready for replacement.

15. The cover according to claim 14, further comprising a base layer, said wear detection component mounted to said base layer and being formed from a first material having a first thickness, said wear layer being formed from a second material and having a second thickness, and said second material is the same as, similar to, or different from said first material.

16. The cover according to claim 15, wherein said second thickness is less than said first thickness.

17. The cover according to claim 14, wherein said wear layer comprises first and second layers, said first layer forming an exterior surface of said wear layer, wherein when said first layer has reduced its thickness to said threshold thickness or disintegrated said visual wear indicator is revealed.

18. The cover according to claim 17, wherein said first layer or said second layer includes said visual wear indicator.

19. The cover according to claim 14, wherein said visual wear indicator includes a color, further comprising a reference layer formed from a material more durable than said cover or said wear indicator component, said reference layer having a color the same as said color of said visual wear indicator wherein a user can compare the color intensities of said visual wear indicator and said reference layer to determine when said cover has been through said preselected number of cleanings and is ready for replacement.

20. A method of indicating when a cover has reached a threshold level of wear, the method comprising:

provided a wear detection component comprising:
- a wear layer having a thickness, at least a portion of the wear layer designed and configured to reduce its thickness to a threshold thickness or to disintegrate after a preselected number of cleanings; and
- a visual wear indicator at least partially concealed by the wear layer when the wear layer has not reduced its thickness to the threshold thickness or disintegrated;

securing the wear detection component to the cover; and indicating to a user that the cover has reached the threshold level of wear when at least a portion of the wear layer has reduced its thickness to the threshold thickness or has disintegrated such that the wear layer reveals the visual wear indicator.

* * * * *